United States Patent
Kuroda et al.

(10) Patent No.: US 9,815,432 B2
(45) Date of Patent: Nov. 14, 2017

(54) SEAT BELT INSTALLATION STRUCTURE OF VEHICLE

(71) Applicant: HONDA MOTOR CO., LTD., Tokyo (JP)

(72) Inventors: Kosuke Kuroda, Wako (JP); Hironori Nozawa, Wako (JP); Jun Tomiyama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/669,703

(22) Filed: Mar. 26, 2015

(65) Prior Publication Data

US 2015/0274121 A1 Oct. 1, 2015

(30) Foreign Application Priority Data

Mar. 31, 2014 (JP) ................. 2014-073703

(51) Int. Cl.
*B60R 22/26* (2006.01)
*B60R 22/02* (2006.01)

(52) U.S. Cl.
CPC ............ *B60R 22/26* (2013.01); *B60R 22/023* (2013.01)

(58) Field of Classification Search
CPC ......... B60R 22/18; B60R 22/24; B60R 22/26; B60R 22/34
See application file for complete search history.

(56) References Cited

U.S. PATENT DOCUMENTS

| 5,897,169 | A | 4/1999 | Larsen et al. | |
|---|---|---|---|---|
| 5,979,991 | A * | 11/1999 | Lewandowski | B60R 22/26 297/391 |
| 7,314,235 | B2 * | 1/2008 | Downey | B60R 22/024 280/808 |
| 7,874,606 | B2 * | 1/2011 | Yamamura | B60N 2/3011 296/182.1 |
| 8,550,500 | B2 * | 10/2013 | Yamamoto | B60R 22/24 280/749 |
| 8,876,162 | B2 * | 11/2014 | Shinbori | B60R 22/023 280/756 |
| 2014/0110988 | A1 * | 4/2014 | Nakanishi | B60N 2/688 297/481 |
| 2015/0259011 | A1 * | 9/2015 | Deckard | B62D 21/183 280/781 |
| 2015/0274120 | A1 * | 10/2015 | Hayashi | B60R 22/18 280/771 |

* cited by examiner

Primary Examiner — Philip F Gabler
(74) Attorney, Agent, or Firm — Squire Patton Boggs (US) LLP (57) ABSTRACT

A seat belt installation structure of a vehicle may include a seat which has a seat cushion and a seat back, and on which occupants can be seated alongside in a vehicle width direction. The seat belt installation structure may also include a three point seat belt device provided with a retractor that can wind a webbing, a through anchor that guides a shoulder belt part and a supporting part that supports a lap belt part. In the three point seat belt device, a through anchor for at least a first seat out of a plurality of seats adjacent to one another in the vehicle width direction may be attached to a headrest for a second seat located next to the first seat or a fixing part that fixes the headrest for the second seat.

10 Claims, 6 Drawing Sheets

SEAT BELT INSTALLATION STRUCTURE OF VEHICLE

BACKGROUND

Field

The present invention relates to a seat belt installation structure of a vehicle.

Description of the Related Art

A seat belt installation structure of a vehicle is described in patent literature 1 (U.S. Pat. No. 5,897,169) for example. This is based upon a configuration that a headrest is supported by a seat back via a vertically extended supporting pipe and has a characteristic that a through anchor for an own seat is fixed to the supporting pipe for the own seat.

To set a shoulder belt part that restrains an occupant's shoulder in a suitable position of the occupant's shoulder in a state in which a webbing that can restrain the occupant's body on a seat is worn in a seat belt installation structure of a vehicle, a through anchor is required to overhang outward from right and left ends of a headrest for the occupant's own seat and strength is demanded for a supporting pipe.

Some types of four-wheel vehicles are not necessarily provided with a headrest to an own seat.

In these cases, structure that the through anchor can be set in an advantageous position in terms of strength and can be lightened is demanded.

SUMMARY

Certain embodiments of the present invention are based upon a seat belt installation structure of a vehicle, and an object of the present invention is to set a through anchor in an advantageous position in terms of strength and to lighten the seat belt installation structure when a shoulder belt part is set in a suitable position of an occupant's shoulder.

In some embodiments, a seat belt installation structure of a vehicle is provided with a seat which has a seat cushion and a seat back and on which occupants can be seated alongside in a vehicle width direction. The seat belt installation structure also includes a three point seat belt device including a retractor which is supported by a body and which can wind a webbing, a through anchor which is arranged on the upside of the seat back and which guides a shoulder belt part that restrains each shoulder of the occupants out of the webbing pulled out of the retractor when the webbing that can restrain each body of the occupants on the seat is worn. The seat belt installation structure further includes supporting parts which are arranged on both sides of a position of each loin of the occupants on the seat cushion and which support a lap belt part that restrains each loin of the occupants out of the webbing pulled out of the retractor (52) when the webbing is worn. In the three point seat belt device, the through anchor for at least a first seat out of a plurality of seats adjacent to one another in the vehicle width direction is attached to a headrest for the second seat located next to the first seat or a fixing part that fixes the headrest for the second seat.

In some embodiments, the seat belt installation structure of a vehicle is provided with a seat which has a seat cushion and a seat back, and on which occupants can be seated alongside in a vehicle width direction. The seat belt installation structure also includes a three point seat belt device including a retractor which is supported by a body and which can wind a webbing, a through anchor which is arranged on the upside of the seat back and which guides a shoulder belt part that restrains each shoulder of the occupants out of the webbing pulled out of the retractor when the webbing that can restrain each body of the occupants on the seat is worn. The seat belt installation structure further includes supporting parts which are arranged on both sides of a position of each loin of the occupants on the seat cushion and which support a lap belt part that restrains each loin of the occupants out of the webbing pulled out of the retractor when the webbing is worn. The seat is further provided with a headrest fixed to the body separately from the seat back and that, in the three point seat belt device, the through anchor is attached to the headrest or a fixing part that fixes the headrest.

In some embodiments, the headrest on the upside of the seat is fixed to the body separately from the seat back.

In some embodiments, the seat back, backrests of the plurality of seats adjacent to one another in the vehicle width direction are integrally molded.

In some embodiments, the seat cushion and the seat back that respectively configure the seat are respectively integrally molded for at least three occupants in the vehicle width direction. The seat cushion is fixed to a lower part of the body and the seat back is fixed to an upper part of the body. Further, in the three point seat belt device, the through anchors for the two occupants on both sides in the vehicle width direction out of the plurality of occupants are attached to vertically extended parts vertically extended outside in the vehicle width direction in the upper part of the body and the through anchor for the occupant in the center in the vehicle width direction and adjacent to a driver out of the plurality of occupants is attached to the headrest for the seat on the opposite side to the seat on the side of the driver or the fixing part that fixes the headrest.

In some embodiments, the three point seat belt device, a mounting part for mounting the through anchor is provided in an inclined extended part that diagonally connects the vertically extended parts vertically extended outside in the vehicle width direction in the upper part of the body and the center in the vehicle width direction of the lower part of the body.

According to certain embodiments of the present invention, as the through anchor for the own seat is attached to the headrest for the adjacent seat or the fixing part that fixes the headrest, the through anchor is not required to be attached with the through anchor overhanging outward from right and left ends of the headrest for the own seat and the through anchor can be lightened. Even if no headrest for the own seat is provided when the webbing is worn, the shoulder belt part can be extended diagonally downward through the through anchor. Therefore, when the shoulder belt part is set in the suitable position of the shoulder of the occupant, the through anchor can be set in the advantageous position in terms of strength and the seat belt installation structure can be lightened.

According to other embodiments of the present invention, as the through anchor is fixed to the headrest fixed to the body separately from the seat back or the fixing part that fixes the headrest, no load of the shoulder belt part is applied to the seat back. Therefore, the seat back can be lightened. When the webbing is worn, the shoulder belt part can be extended diagonally downward through the through anchor. Thereby, when the shoulder belt part is set in the suitable position of the occupant's shoulder, the through anchor can be set in the advantageous position in terms of strength and the seat belt installation structure can be lightened.

According to other embodiments of the present invention, no load of the shoulder belt part is applied to the seat back by fixing the headrest to the body separately from the seat back. Therefore, the seat back can be lightened and the seat belt installation structure can be lightened.

According to other embodiments of the present invention, the displacement of a position in which the webbing touches the occupant's body can be inhibited by integrally molding the backrests of plural seats adjacent in the vehicle width direction, compared with a case in which the backrest of each seat arranged in the vehicle width direction is moved in the longitudinal direction of the vehicle.

According to other embodiments of the present invention, as the strength of the upper part of the body is increased by fixing the seat back to the upper part of the body, the increase of the weight of the seat back can be avoided. As the through anchor is attached to the headrest for the seat on the opposite side to the seat on the side of the driver or the fixing part that fixes the headrest, the webbing for the seat in the center in the vehicle width direction hardly obstructs when one or two occupants are seated.

According to other embodiments of the present invention, as the mounting part for the through anchor is provided in the inclined extended part that forms truss structure between upper and lower parts of the body, the strength of the mounting part for the through anchor can be readily secured.

DETAILED DESCRIPTION

Referring to the drawings, certain embodiments of the present invention will be described below. Directions in the longitudinal direction and in the lateral direction or the like in the following description shall be the same as directions in the following vehicle unless otherwise specified. In suitable locations in the drawings used for the following description, an arrow FR denoting the front side of the vehicle, an arrow LH denoting the left side of the vehicle and an arrow UP denoting the upside of the vehicle are shown. In addition, a line CL in the drawings denotes a center line in the lateral direction of a vehicle body.

Figure 1:
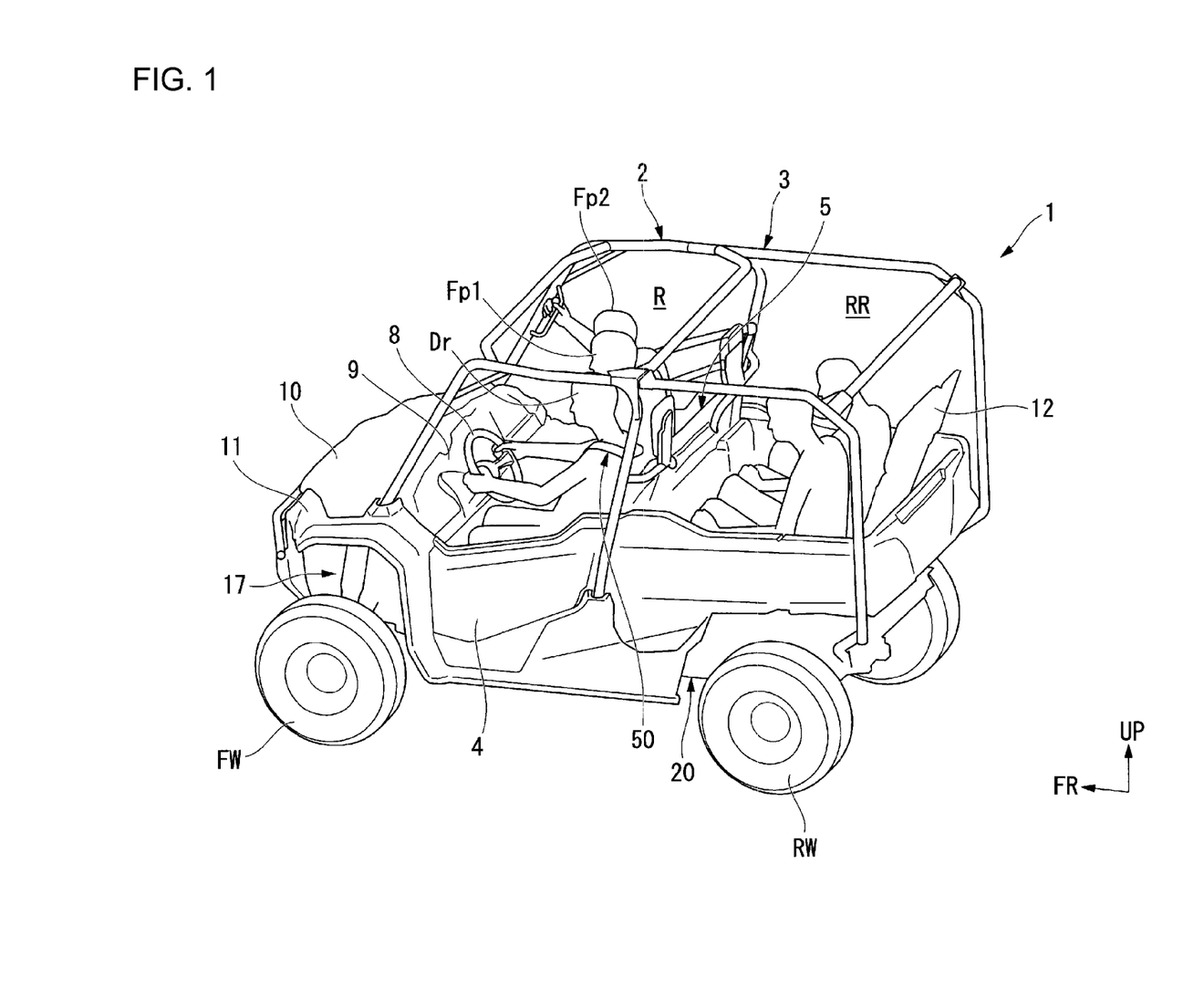
FIG. 1 is a perspective view showing a vehicle in an embodiment of the present invention.

A four-wheel vehicle 1 (vehicle 1) shown in FIG. 1 is a so-called side-by-side type multi-utility vehicle (MUV) where three occupants Dr, Fp1 and Fp2 are seated alongside in the vehicle width direction on a front seat. The vehicle 1 is provided with front wheels FW as a pair of right and left steering wheels on both sides in the lateral direction in the front of the vehicle body and is provided with rear wheels RW as a pair of right and left driving wheels on both sides in the lateral direction in the rear of the vehicle body.

The vehicle 1 is provided with a body 2 that defines seating space R. The body 2 includes a roll bar 3, a door 4, and a body frame 20.

The roll bar 3 is located on the upside of the body 2. The roll bar 3 is formed by a steel tube, a steel plate or synthetic resin and encloses the vehicular space R.

The doors 4 are located at right and left side ends in the vehicle width direction of the body 2. The doors 4 cover both right and left sides of the seating space R.

The body frame 20 is located on the downside of the body 2.

In the seating space R, a seat 5 and a seat belt device 50 are arranged. A steering wheel 8 and an instrument panel 9 are arranged in the front of the seating space R and in front of the seat 5. A front hood 10 that continues to the front of the instrument panel 9 is arranged in front of the instrument panel 9. Front fenders 11 that continue to right and left sides of the front hood 10 are arranged on the right and left sides of the front hood 10.

Rear space RR as a cargo room or rear seating space is formed in the rear of the seating space R and at the back of the seat 5. FIG. 1 shows a state in which two rear occupants are seated alongside in the vehicle width direction on a seat (not shown) exposed by opening a floor plate 12 on which a cargo is laid.

Figure 2:
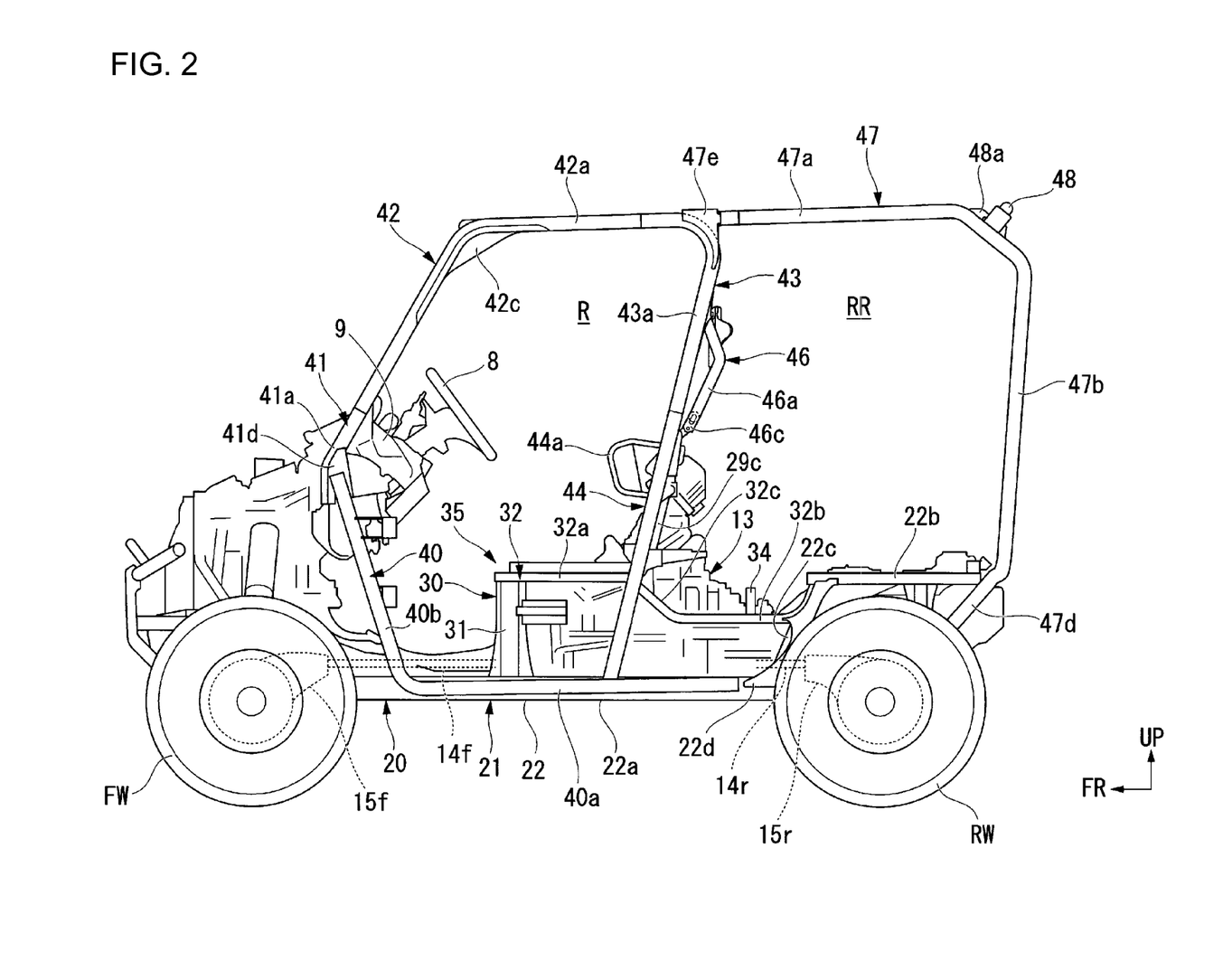
FIG. 2 is a left side view showing the vehicle.
Figure 3:
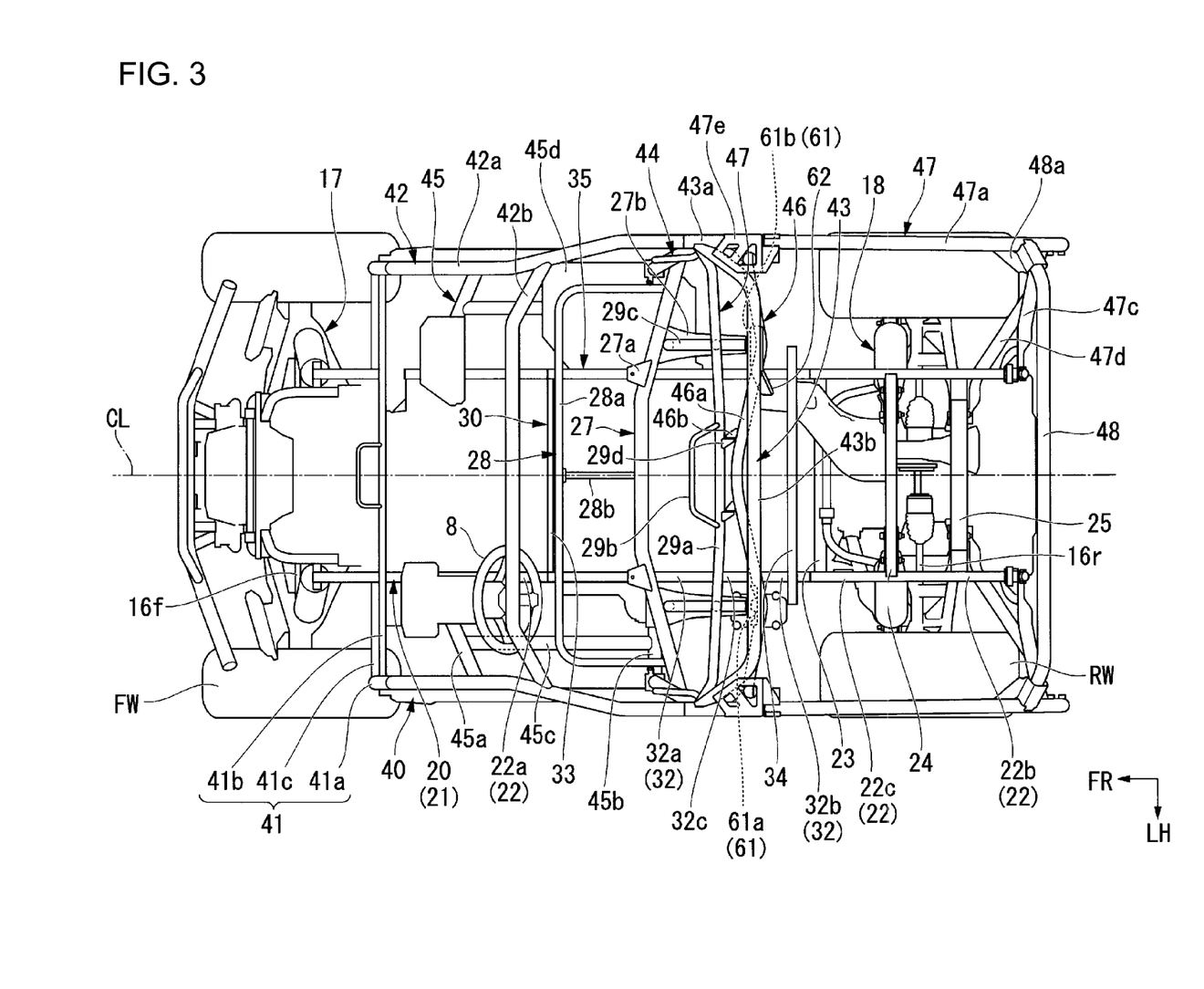
FIG. 3 is a top view showing the vehicle.
Figure 4:
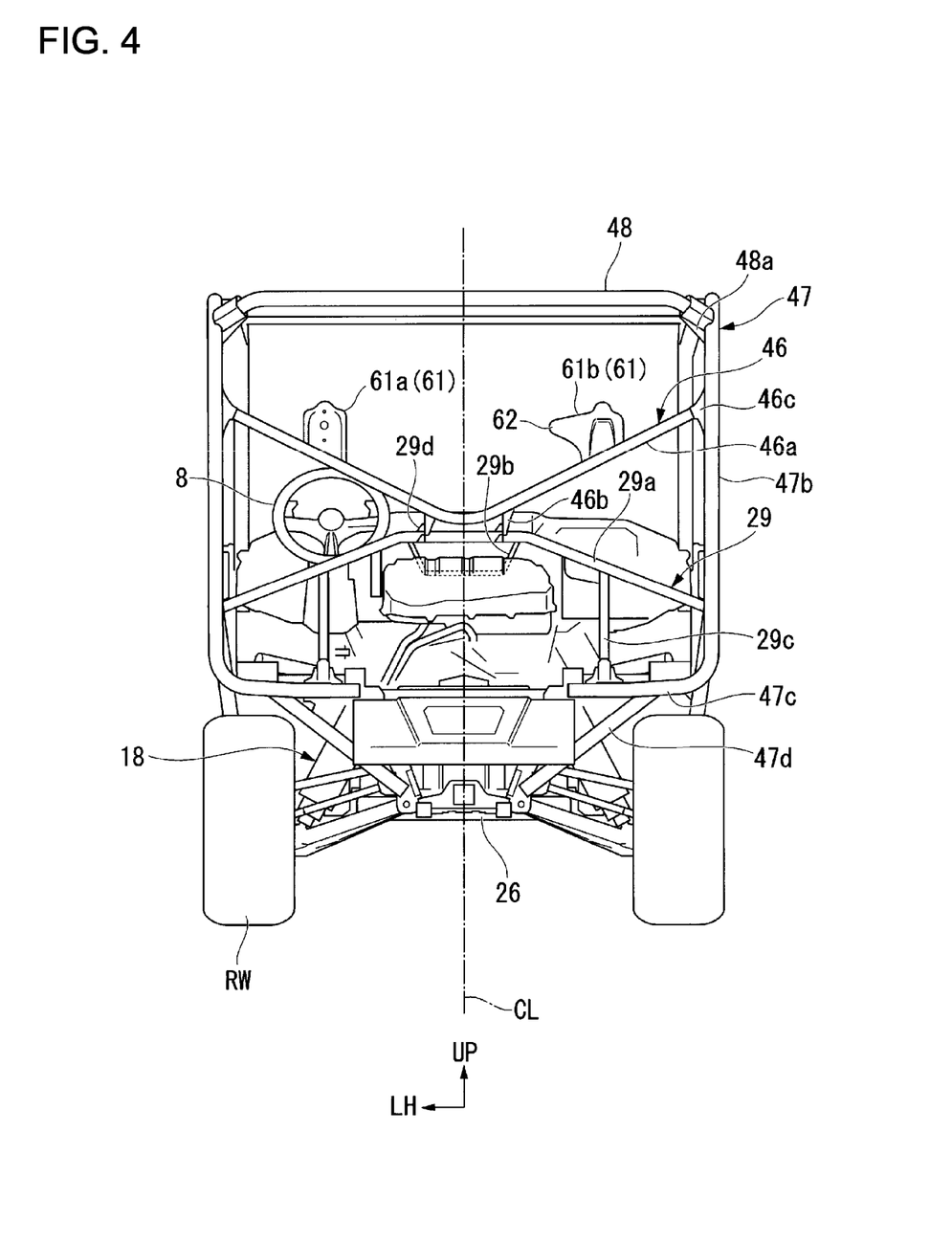
FIG. 4 is a rear view showing the vehicle.

Referring to FIGS. 2 to 4, a running gear 13 supported by the body frame 20 is arranged at the downside and rear of the seat 5. The running gear 13 is provided with at least one of an internal combustion engine and an electric motor as a motor. The running gear 13 outputs its driving force respectively to a front propeller shaft 14f and a rear propeller shaft 14r.

The front propeller shaft 14f is connected to a front differential mechanism 15f supported by the front of the body frame 20. The rear propeller shaft 14r is connected to a rear differential mechanism 15r supported by the rear of the body frame 20. A front drive shaft 16f (see FIG. 3) is extended from the front differential mechanism 15f and is connected to the right and left front wheels FW. A rear drive shaft 16r (see FIG. 3) is extended from the rear differential mechanism 15r and is connected to the right and left rear wheels RW.

The body frame 20 is provided with a frame main body 21, a subframe 30, a center cross frame 27 (see FIG. 3), a seat cushion frame 28 (see FIG. 3) and a seat back frame 29 (see FIG. 3). The body frame 20 is configured by integrally coupling the subframe 30 that is a separate body, the center cross frame 27, the seat cushion frame 28 and the seat back frame 29 to the center in the longitudinal direction of the frame main body 21 including a pair of right and left side frames 22 by bolts.

The frame main body 21 is configured by integrally joining a plurality of types of square steel bars by welding. The right and left side frames 22 are longitudinally extended inside a pair of right and left side roll bars 40 that configure the body 2 in the vehicle width direction. The right and left side frames 22 are linearly extended in a top view.

Each right/left side frame 22 is provided with a center part 22a, a rear part 22b and a stepped part 22c.

The center part 22a is arranged inside the right/left side roll bar 40 in the vehicle width direction in parallel and is extended longitudinally.

The rear part 22b is located at the back of the center part 22a and is displaced upward above the center part 22a to longitudinally extend in a lower part of the rear space RR.

The stepped part 22c connects the center in the longitudinal direction in the rear of the center part 22a and a front end of the rear part 22b.

A pair of right and left gussets 22d (see FIG. 2) are fixed astride the center in the longitudinal direction in the rear of the center part 22a, the stepped part 22c and the front end of the rear part 22b.

A rear lower cross frame 23 (see FIG. 3) the section of which is rectangular and which is extended in the lateral direction is laid between front lower ends of the stepped parts 22*c* of the right and left side frames 22. A first rear upper cross frame 24 the section of which is rectangular and which is extended in the lateral direction is laid between front ends of the rear parts 22*b* of the right and left side frames 22. A second rear upper cross frame 25 the section of which is rectangular and which is extended in the lateral direction is laid between rear ends of the rear parts 22*b* of the right and left side frames 22. A rear end cross frame 26 (see FIG. 4) the section of which is rectangular and which is extended in the lateral direction is laid between rear ends of the center parts 22*a* of the right and left side frames 22.

The subframe 30 is configured by integrally joining plural types of square steel tubes by welding. The subframe 30 is provided with a pair of right and left lower sub side frames 31, a pair of right and left upper sub side frames 32, a first upper cross frame 33 and a second upper cross frame 34.

The right and left lower sub side frames 31 are extended substantially vertically upward from intermediate parts in the longitudinal direction in the fronts of the center parts 22*a* of the right and left side frames 22.

Each right/left upper sub side frame 32 is provided with a center part 32*a*, a rear part 32*b* and a stepped part 32*c*.

The center parts 32*a* are arranged in positions overlapped with the centers in the longitudinal direction of the center parts 22*a* of the right and left side frames 22 in the top view and are extended in the longitudinal direction.

The rear parts 32*b* are arranged in positions overlapped with the centers in the longitudinal direction in the rears of the center parts 22*a* of the right and left side frames 22 in the top view, are displaced on the downsides of the center parts 32*a*, and are extended in the longitudinal direction. A rear end of the rear part 32*b* is coupled to the center in a vertical direction of the part having difference in the stepped part 22*c* of the right/left side frame 22.

The stepped part 32*c* connects a rear end of the center part 32*a* and a front end of the rear part 32*b*.

The first upper cross frame 33 has a rectangular section, is extended in the lateral direction, and is laid between front ends of the right and left upper sub side frames 32.

The second upper cross frame 34 has a rectangular section, is extended in the lateral direction, and is laid between rear ends of the right and left upper sub side frames 32.

Box structure 35 is formed as a whole by the center parts 22*a* of the right and left side frames 22, the right and left lower sub side frames 31, the right and left upper sub side frames 32, the first upper cross frame 33 and the second upper cross frame 34. The running gear 13 can be mounted inside the box structure 35.

The center cross frame 27 is located on the upsides of the right and left upper sub side frames 32, has a rectangular section, is extended in the lateral direction, and is laid between centers in the vertical direction of right and left center side roll bars 44 described later. The center in the vehicle width direction of the center cross frame 27 is linearly extended in the vehicle width direction in the top view. The outside in the vehicle width direction of the center cross frame 27 is inclined in the top view so that the outermost part in the vehicle width direction is located on the rear side in the longitudinal direction of the vehicle.

A pair of right and left gussets 27*a* (see FIG. 3) are fixed astride the outside in the vehicle width direction of the center cross frame 27 and the center part 32*a* of the right/left upper sub side frame 32.

The seat cushion frame 28 is provided with a main body 28*a* and a coupling part 28*b*.

The main body 28*a* is located on the upsides of the right and left upper sub side frames 32, has a rectangular section, is extended in the lateral direction, and connects the right and left outsides in the vehicle width direction of the center cross frame 27. The main body 28*a* is U-shaped in the top view.

The coupling part 28*b* couples the center in the vehicle width direction of the main body 28*a* and the center in the vehicle width direction of the center cross frame 27. The coupling part 28*b* is linearly extended in the longitudinal direction of the vehicle in the top view.

The seat back frame 29 is provided with a cross part 29*a*, a supporting part 29*b*, a pair of right and left coupling parts 29*c* and a pair of right and left connecting parts 29*d*.

The cross part 29*a* has a rectangular section, is extended in the lateral direction, and is laid between the centers in the vertical direction of the right and left center side roll bars 44 described later. The center in the vehicle width direction of the cross part 29*a* is brought close to the center in the vehicle width direction of a cross part (an inclined extended part) 46*a* of a center cross roll bar 46 described later and is linearly extended in the vehicle width direction in the rear view. The outside in the vehicle width direction of the cross part 29*a* is inclined in the rear view so that the outermost part in the vehicle width direction is located on the downside in the vertical direction of the vehicle.

The supporting part 29*b* is U-shaped protruding forward and downward from the center in the vehicle width direction of the cross part 29*a*.

The right and left coupling parts 29*c* have a rectangular section, are extended in the vertical direction, and are laid between the cross part 29*a* and each outside in the vehicle width direction of the center cross frame 27.

A pair of right and left gussets 27*b* (see FIG. 3) are fixed astride each lower end of the right and left coupling parts 29*c* and each outside in the vehicle width direction of the center cross frame 27.

The right and left connecting parts 29*d* protrude upward from the center in the vehicle width direction of the cross part 29*a* toward the cross part 46*a* of the center cross roll bar 46 described later.

The right and left front wheels FW are suspended via a double wishbone type front suspension 17 in the front of the body frame 20. The right and left rear wheels RW are suspended via a double wishbone type rear suspension 18 in the rear of the body frame 20.

The roll bar 3 is configured by integrally joining a plurality of types of round steel tubes by welding. The roll bar 3 is provided with the pair of right and left side roll bars 40, a front top roll bar 41, a front upper roll bar 42, a center upper roll bar 43, the pair of right and left center side roll bars 44, a lower roll bar 45, the center cross roll bar 46, a pair of right and left rear side roll bars 47 and a rear cross roll bar 48.

The right and left side roll bars 40 are linearly extended in the longitudinal direction of the vehicle in the top view. The right and left side roll bars 40 are provided with a pair of right and left lower parts 40*a* and a pair of right and left front parts 40*b*.

The right and left lower parts 40*a* are arranged on the downsides of the right and left doors 4, are arranged in positions overlapping with the centers in the longitudinal direction of the center parts 22*a* of the right and left side frames 22 in the side view, and are extended in the longitudinal direction.

The right and left front parts 40b connect with front ends of the right and left lower parts 40a and are inclined in the side view so that the uppermost parts are located on the front side in the longitudinal direction of the vehicle.

The front top roll bar 41 is provided with a pair of right and left top side parts 41a, an upper cross part 41b and a lower cross part 41c.

The right and left top side parts 41a connect upper ends of the front parts 40b of the right and left side roll bars 40 and lower ends of the fronts of the right and left upper side parts 42a of the front upper roll bar 42. Lower parts of the right and left top side parts 41a are substantially vertically extended in the side view. Upper parts of the right and left top side parts 41a are inclined in the side view so that the uppermost parts are located on the rear side in the longitudinal direction of the vehicle.

A pair of right and left gussets 41d (see FIG. 2) are fixed astride the lower ends of the right and left top side parts 41a and the upper ends of the front parts 40b of the right and left side roll bars 40.

The upper cross part 41b has a circular section, is extended in the lateral direction, and is laid between the upper ends of the right and left top side parts 41a.

The lower cross part 41c has a circular section, is extended in the lateral direction, and is laid between the lower ends of the right and left top side parts 41a.

The front upper roll bar 42 is provided with a pair of right and left upper side parts 42a and a cross part 42b.

The right and left upper side parts 42a are arranged on the right and left sides in the vehicle width direction in the seating space R. The fronts of the right and left upper side parts 42a are inclined in the side view so that the lowermost parts are located on the front side in the longitudinal direction of the vehicle. The rears of the right and left upper side parts 42a connect with rear ends of the fronts of the right and left upper side parts 42a and are extended substantially horizontally in the longitudinal direction in the side view.

A pair of right and left gussets 42c (see FIG. 2) are fixed astride the rear ends of the fronts of the right and left upper side parts 42a and front ends of the rears of the right and left upper side parts 42a.

The right and left upper side parts 42a are bent outward in the vehicle width direction from before joints with the cross part 42b and are inclined backward and outward after linearly extended in the top view in the longitudinal direction of the vehicle with joints with the right and left top side parts 41a as starting points, and afterward, are linearly extended in the longitudinal direction of the vehicle close to joints with a cross part 43b of the center upper roll bar 43.

The cross part 42b has a circular section, is extended in the lateral direction, and is laid between intermediate parts in the longitudinal direction of the right and left upper side parts 42a. The center in the vehicle width direction of the cross part 42b is extended substantially horizontally in the vehicle width direction in the top view. The right and left outsides in the direction of vehicle width of the cross part 42b are inclined in the top view so that the outermost parts in the vehicle width direction are located on the rear side in the longitudinal direction of the vehicle.

The center upper roll bar 43 is provided with a pair of right and left center side parts (vertically extended parts) 43a and the cross part 43b.

The right and left center side parts 43a are L-type in the side view and are vertically extended. Front ends of upper parts of the right and left center side parts 43a connect with rear ends of the rears of the right and left upper side parts 42a of the front upper roll bar 42. Lower parts of the right and left center side parts 43a are linearly extended with the lower parts inclined in the side view so that their lower ends are located on the front side in the longitudinal direction of the vehicle.

The cross part 43b has a circular section, is extended in the lateral direction, and is laid between the fronts of upper parts of the right and left center side parts 43a. The center in the vehicle width direction of the cross part 43b is linearly extended in the vehicle width direction in the top view. The right and left outsides in the vehicle width direction of the cross part 43b are inclined in the top view so that the outermost parts in the vehicle width direction are located on the front side in the longitudinal direction of the vehicle.

Upper ends of the right and left center side roll bars 44 connect with lower ends of the right and left center side parts 43a of the center upper roll bar 43 and their lower ends connect with right and left ends in the vehicle width direction of a second cross part 45b of the lower roll bar 45. The right and left center side roll bars 44 are inclined in the side view so that the lowermost parts are located on the front side in the longitudinal direction of the vehicle and are linearly extended continuously with the right and left center side parts 43a. A bracket 44a (see FIG. 2) for supporting the right and left doors 4 (see FIG. 1) protrudes forward from upper parts of the right and left center side roll bars 44.

The lower roll bar 45 is provided with a first cross part 45a, the second cross part 45b and a pair of right and left coupling parts 45c.

The first cross part 45a has a circular section, is extended in the lateral direction, and is laid between the fronts of the right and left lower parts 40a of the right and left side roll bars 40. The center in the vehicle width direction of the first cross part 45a is integrally coupled to the frame main body 21 of the body frame 20 by a bolt. The right and left ends in the vehicle width direction of the first cross part 45a are inclined in the top view so that the outermost parts in the vehicle width direction are located on the rear side in the longitudinal direction of the vehicle.

The second cross part 45b has a circular section, is extended in the lateral direction, and is laid between the rears of the right and left lower parts 40a of the right and left side roll bars 40. The second cross part 45b is linearly extended in the vehicle width direction. The center in the vehicle width direction of the second cross part 45b is integrally coupled to the frame main body 21 of the body frame 20 by a bolt.

The right and left coupling parts 45c have a circular section, are extended in the longitudinal direction, and are laid between outside ends in the vehicle width direction of the first cross part 45a and the second cross part 45b. The right and left coupling parts 45c are linearly extended in the longitudinal direction of the vehicle.

A gusset 45d (see FIG. 3) is fixed astride a right end of the second cross part 45b and the rear of the right coupling part 45c.

The center cross roll bar 46 is provided with the cross part 46a and a pair of right and left connecting parts 46b.

The cross part 46a has a circular section, is extended in the lateral direction, and is laid between the centers in the vertical direction of the right and left center side parts 43a of the center upper roll bar 43. The cross part 46a diagonally connects the centers in the vertical direction of the right and left center side parts 43a of the center upper roll bar 43 and the center in the vehicle width direction (the center in the vehicle width direction of a lower part of the body 2) of the cross part 29a of the seat back frame 29. The center in the vehicle width direction of the cross part 46*a* has a curved shape protruding downward in the rear view. The outside in the vehicle width direction of the cross part 46*a* is inclined in the rear view so that the outermost part in the vehicle width direction is located on the upside in the vertical direction of the vehicle.

A first bracket (a fixing part) 61*a* that supports a first headrest 60*a* described later is provided in the center in the vehicle width direction of the left side in the vehicle width direction of the cross part 46*a* with the first bracket protruding upward. A second bracket (a fixing part) 61*b* that supports a second headrest 60*b* described later is provided in the center in the vehicle width direction of the right side in the vehicle width direction of the cross part 46*a* with the second bracket protruding upward. A mounting part 62 for mounting a second through anchor 53*b* described later is provided in the second bracket 61*b* with the mounting part protruding inward in the vehicle width direction.

The first bracket 61*a* and the second bracket 61*b* may be generically called the fixing part 61.

A pair of right and left gussets 46*c* are fixed astride the outside in the vehicle width direction of the cross part 46*a* and the center in the vertical direction of the right/left center side part 43*a* of the center upper roll bar 43.

The right and left connecting parts 46*b* protrude downward from the center in the vehicle width direction of the cross part 46*a* toward the cross part 29*a* of the seat back frame 29. The center in the vehicle width direction of the cross part 46*a* of the center cross roll bar 46 and the center in the vehicle width direction of the cross part 29*a* of the seat back frame 29 are connected to each other by connecting the right and left connecting parts 46*b* of the center cross roll bar 46 and the right and left connecting parts 29*d* of the seat back frame 29.

The right and left rear side roll bars 47 are arranged on the right and left sides in the vehicle width direction of the rear space RR. The right and left rear side roll bars 47 are provided with a pair of right and left upper parts 47*a*, a pair of right and left rear parts 47*b*, a pair of right and left lower parts 47*c* and a pair of right and left rear ends 47*d*.

The right and left upper parts 47*a* are coupled to the right and left center side parts 43*a* of the center upper roll bar 43 by a bolt and are linearly extended in the longitudinal direction of the vehicle in the top view.

A pair of right and left gussets 47*e* are fixed astride a front end of the right and left upper part 47*a* and the right/left center side part 43*a* of the center upper roll bar 43.

The right and left rear parts 47*b* connect with rear ends of the right and left upper parts 47*a* and are gently inclined in the side view so that the lowermost parts are located on the front side in the longitudinal direction of the vehicle.

The right and left lower parts 47*c* connect with lower ends of the right and left rear parts 47*b* and are extended inward in the vehicle width direction.

The right and left rear ends 47*d* connect with the centers in the vehicle width direction of the right and left lower parts 47*c* and are inclined in the rear view so that the lowermost parts are located inside in the vehicle width direction.

The rear cross roll bar 48 has a circular section, is extended in the lateral direction, and is laid between bent parts of the right and left rear side roll bars 47 (parts that couple the right and left upper parts 47*a* and the right and left rear parts 47*b*). A pair of right and left gussets 48*a* are fixed astride outside ends in the vehicle width direction of the rear cross roll bar 48 and the bent parts of the right and left rear side roll bars 47.

Figure 5:
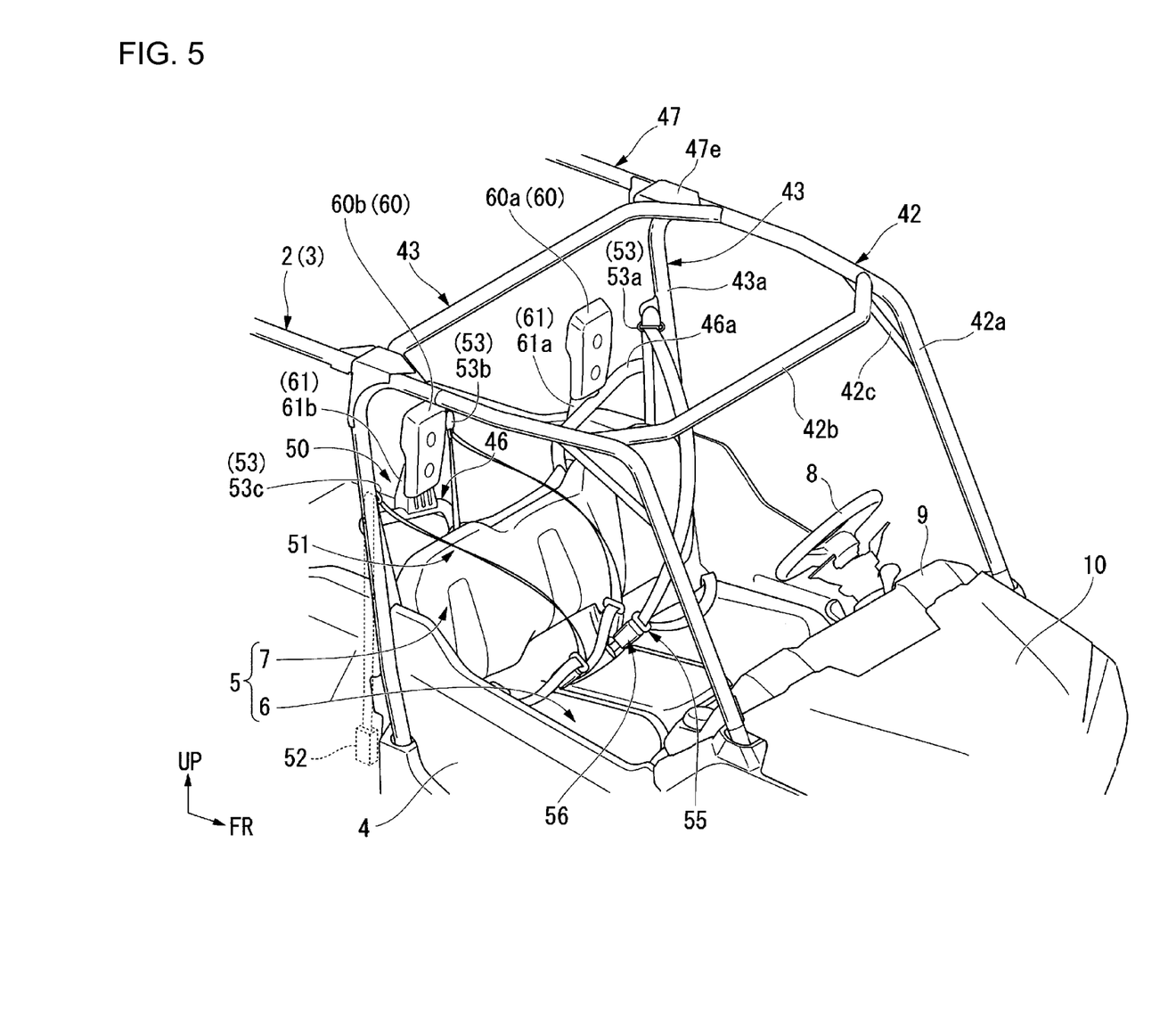
FIG. 5 is a perspective view showing seat belt installation structure of the vehicle.
Figure 6:
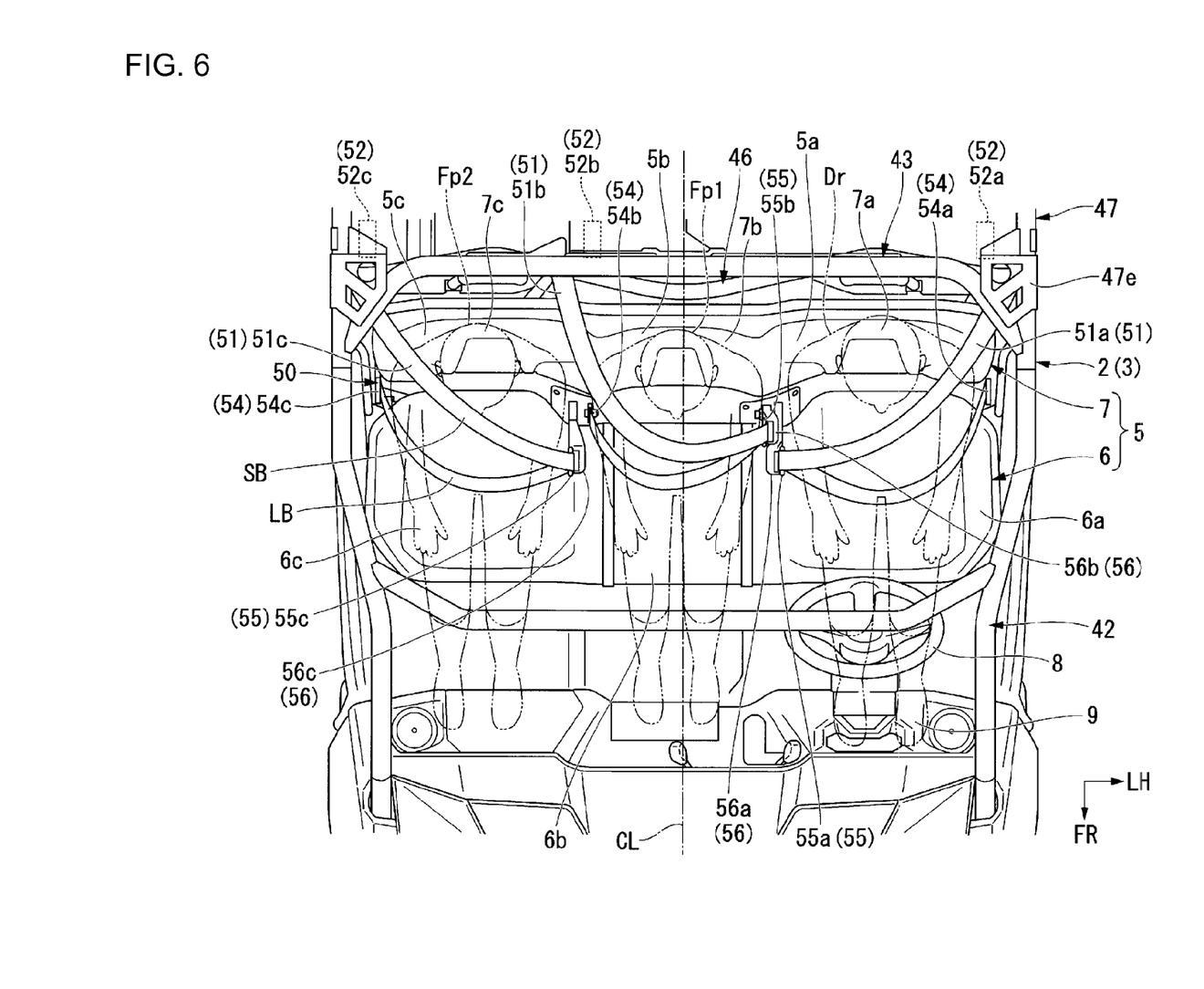
FIG. 6 is a top view showing the seat belt installation structure.

Referring to FIGS. 5 and 6, the seat 5 is provided with a seat cushion 6 and a seat back 7. As for the seat 5, the seat cushion 6 and the seat back 7 are integrally molded for three persons seated in the vehicle width direction.

The seat 5 is provided with a plurality of (for example, three in this embodiment) seats 5*a*, 5*b*, 5*c* adjacent to one another in the vehicle width direction.

The seat 5*a* on the left side in the vehicle width direction is a seat for a driver Dr.

The seat (the first seat) 5*b* in the center in the vehicle width direction is a seat for a first occupant Fp1 adjacent to the right side of the driver Dr.

The seat (the second seat) 5*c* on the right side in the vehicle width direction is a seat adjacent to the right side of the first occupant Fp1, that is, a seat for a second occupant on the opposite side to the seat 5*a* for the driver Dr when the seat is viewed from the first occupant Fp1.

The seat cushion 6 is provided with a first seat body 6*a*, a second seat body 6*b* and a third seat body 6*c*.

The first seat body 6*a* is a seat body on which the driver Dr is seated and is located on the left side in the vehicle width direction.

The second seat body 6*b* is a seat body on which the first occupant Fp1 is seated and is located in the center in the vehicle width direction.

The third seat body 6*c* is a seat body on which the second occupant Fp2 is seated and is located on the right side in the vehicle width direction.

As for the seat cushion 6, the first seat body 6*a*, the second seat body 6*b* and the third seat body 6*c* adjacent to one another in the vehicle width direction, are integrally molded.

The seat cushion 6 is fixed and supported to/by the seat cushion frame 28 (see FIG. 3) that configures the body frame 20.

The seat back 7 is provided with a first backrest 7*a*, a second backrest 7*b* and a third backrest 7*c*.

The first backrest 7*a* is a backrest for the driver Dr to recline on and is located on the left side in the vehicle width direction.

The second backrest 7*b* is a backrest for the first occupant Fp1 to recline on and is located in the center in the vehicle width direction.

The third backrest 7*c* is a backrest for the second occupant Fp2 to recline on and is located on the right side in the vehicle width direction.

As for the seat back 7, the first backrest 7*a*, the second backrest 7*b* and the third backrest 7*c* adjacent to one another in the vehicle width direction, are integrally molded.

The seat back 7 is fixed and supported to/by the cross part 29*a*, the supporting part 29*b* and the pair of right and left coupling parts 29*c* respectively of the seat back frame 29 (see FIG. 4) that configures the body frame 20.

As for the seat 5, a headrest 60 is fixed to the body 2 separately from the seat back 7. The headrest 60 is a member that can hold the heads of the occupants Dr, Fp2. The headrest 60 is in the shape of a rectangle vertically extended in the front view.

The headrest 60 is provided with a first headrest 60*a* that can hold the head of the driver Dr and a second headrest 60*b* that can hold the head of the second occupant Fp2. However, a headrest that can hold the head of the first occupant Fp1 is not provided.

The first headrest 60*a* is fixed and supported to/by the first bracket 61*a* provided on the left side in the vehicle width direction of the cross part 46*a* of the center cross roll bar 46. The second headrest 60*b* is fixed and supported to/by the second bracket 61*b* provided on the right side in the vehicle width direction of the cross part 46*a* of the center cross roll bar 46.

The first headrest 60*a* and the second headrest 60*b* may be generically called the headrest 60.

The seat belt device 50 is a so-called three point seat belt device that fixes breasts of the occupants Dr, Fp1, Fp2 seated on the seat 5 diagonally from respective shoulders to respective loins and can fix and restrain the loins of the occupants Dr, Fp1, Fp2 on the right and left sides of the seat body.

The seat belt device 50 is provided with a webbing 51, a retractor 52, a through anchor 53, an outer anchor (a supporting part) 54, a tongue plate 55 and a buckle (a supporting part) 56.

The webbing 51 is a band-shaped member that can restrain bodies of the occupants Dr, Fp1, Fp2.

The webbing 51 is provided with a first webbing 51*a* that can restrain the body of the driver Dr, a second webbing 51*b* that can restrain the body of the first occupant Fp1 and a third webbing 51*c* that can restrain the body of the second occupant Fp2.

The first webbing 51*a*, the second webbing 51*b* and the third webbing 51*c* may be generically called the webbing 51.

The retractor 52 is provided on the rear downsides of the occupants Dr, Fp1, Fp2. The retractor 52 can wind the webbing 51 and can house at least a part of the webbing 51.

The retractor 52 is provided with a first retractor 52*a* corresponding to the first webbing 51*a*, a second retractor 52*b* corresponding to the second webbing 51*b* and a third retractor 52*c* corresponding to the third webbing 51*c*.

The first retractor 52*a* and the third retractor 52*c* are supported respectively by the right and left sides in the vehicle width direction of the body frame 20 (see FIG. 3) and the second retractor 52*b* is supported by the center in the vehicle width direction of the body frame 20.

The first retractor 52*a*, the second retractor 52*b* and the third retractor 52*c* may be generically called the retractor 52.

The through anchor 53 is arranged on the upside of the seat back 7. The through anchor 53 guides the webbing 51 pulled out of the retractor 52.

The through anchor 53 is provided with a first through anchor 53*a* corresponding to the first webbing 51*a*, a second through anchor 53*b* corresponding to the second webbing 51*b* and a third through anchor 53*c* corresponding to the third webbing 51*c*.

The first through anchor 53*a*, the second through anchor 53*b* and the third through anchor 53*c* may be generically called the through anchor 53.

The outer anchor 54 is arranged between the seat cushion 6 and the seat back 7. The outer anchor 54 is a member for supporting an end of the webbing 51.

The outer anchor 54 is provided with a first outer anchor 54*a* corresponding to the first webbing 51*a*, a second outer anchor 54*b* corresponding to the second webbing 51*b* and a third outer anchor 54*c* corresponding to the third webbing 51*c*.

The first outer anchor 54*a*, the second outer anchor 54*b* and the third outer anchor 54*c* may be generically called the outer anchor 54.

The tongue plate 55 is a member of the webbing 51 which is made to pass between the through anchor 53 and the outer anchor 54.

The tongue plate 55 is provided with a first tongue plate 55*a* corresponding to the first webbing 51*a*, a second tongue plate 55*b* corresponding to the second webbing 51*b* and a third tongue plate 55*c* corresponding to the third webbing 51*c*.

The first tongue plate 55*a*, the second tongue plate 55*b* and the third tongue plate 55*c* may be generically called the tongue plate 55.

The buckle 56 is arranged between the seat cushion 6 and the seat back 7. The buckle 56 is a member for detachably supporting the tongue plate 55.

The buckle 56 is provided with a first buckle 56*a* corresponding to the first tongue plate 55*a*, a second buckle 56*b* corresponding to the second tongue plate 55*b* and a third buckle 56*c* corresponding to the third tongue plate 55*c*.

The first buckle 56*a*, the second buckle 56*b* and the third buckle 56*c* may be generically called the buckle 56.

The webbing 51 is wound in the retractor 52 in an initial state (in a state in which the webbing 51 is not worn) in which each body of the occupants Dr, Fp1, Fp2 is not restrained. The webbing 51 is provided with a shoulder belt part SB that restrains each shoulder of the occupants Dr, Fp1, Fp2 and a lap belt part LB that restrains each loin of the occupants Dr, Fp1, Fp2 in a state in which the webbing 51 that can restrain each body of the occupants Dr, Fp1, Fp2 on the seat 5 is worn.

The shoulder belt part SB is guided by the through anchor 53 when the webbing 51 is worn. In the state in which the webbing 51 is worn, the lap belt part LB is supported on both sides (on both sides of each seat body) of a position of each loin (a position in which the occupant is normally seated) of the occupants Dr, Fp1, Fp2 on the seat cushion 6 by the outer anchor 54 and the buckle 56.

The first through anchor 53*a* of the seat 5*a* for the driver Dr is fixed to the center in the vertical direction of the left center side part 43*a* of the center upper roll bar 43.

The second through anchor 53*b* of the seat 5*b* for the first occupant Fp1 is fixed to the fixing part (the second bracket 61*b*) for fixing the second headrest 60*b* located in the seat 5*c* for the second occupant Fp2 on the opposite side to the seat 5*a* of the driver Dr to the roll bar 3. The second through anchor 53*b* is fixed to the mounting part 62 provided in the second bracket 61*b*.

The third through anchor 53*c* of the seat 5*c* for the second occupant Fp2 is fixed to the center in the vertical direction of the right center side part 43*a* of the center upper roll bar 43.

However, the second through anchor 53*b* of the seat 5*b* for the first occupant Fp1 is not necessarily required to be fixed to the fixing part (the second bracket 61*b*) for fixing the second headrest 60*b* located in the seat 5*c* for the second occupant Fp2 to the roll bar 3. For example, the second through anchor 53*b* of the seat 5*b* for the first occupant Fp1 may also be directly fixed to the second headrest 60*a* located in the seat 5*c* for the second occupant Fp2.

As described above, the above-mentioned embodiments are based upon the seat belt installation structure of the vehicle 1 provided with the seat 5 which is provided with the seat cushion 6 and the seat back 7 and on which the occupants Dr, Fp1, Fp2 can be seated alongside in the vehicle width direction. The seat belt installation structure also includes the three point seat belt device 50 including the retractor 52 which is supported by the body 2 and which can wind the webbing 51, the through anchor 53 which is arranged on the upside of the seat back 7 and which guides the shoulder belt part SB that restrains each shoulder of the occupants Dr, Fp1, Fp2 out of the webbing 51 pulled out of the retractor 52 when the webbing 51 that can restrain each body of the occupants Dr, Fp1, Fp2 on the seat 5 is worn, and the supporting parts 54, 56 for supporting the lap belt parts LB which are arranged on both sides of the position of each loin of the occupants Dr, Fp1, Fp2 on the seat cushion 6 and which restrain loins of the occupants Dr, Fp1, Fp2 out of the webbing 51 pulled out of the retractor 52 when the webbing 51 is worn. In the three point seat belt device 50 according to the above-mentioned embodiments, the through anchor 53 of at least the first seat 5b out of the plurality of seats 5a, 5b, 5c adjacent to one another in the vehicle width direction is attached to the headrest 60 for the second seat 5c located next to the first seat 5b or the fixing part 61 that fixes the headrest 60 for the second seat 5c.

As the through anchor 53 of an own seat is attached to the headrest 60 for the adjacent seat or its fixing part 61, the through anchor 53 is not required to be attached overhanging outward from right and left ends of the headrest 60 for the own seat and the through anchor 53 can be lightened. When the webbing 51 is worn, the shoulder belt part SB can be extended diagonally downward from the through anchor 53 even if no headrest 60 is provided in the own seat. Therefore, when the shoulder belt part SB is set in the suitable position of each shoulder of the occupants Dr, Fp1, Fp2, the through anchor 53 can be set in an advantageous position in terms of strength and the seat belt installation structure can be lightened.

Moreover, in the above-mentioned embodiments, as to the seat 5, the headrest 60 is fixed to the body 2 separately from the seat back 7.

As described above, no load of the shoulder belt part SB is applied to the seat back 7 by fixing the headrest 60 to the body 2 separately from the seat back 7. Therefore, the seat back 7 can be lightened and the seat belt installation structure can be lightened.

In addition, in the above-mentioned embodiments, as to the seat back 7, the backrests 7a, 7b, 7c of the plurality of seats 5a, 5b, 5c adjacent to one another in the vehicle width direction are integrally molded.

As described above, as the backrests 7a, 7b, 7c of the plurality of seats 5a, 5b, 5c adjacent to one another in the vehicle width direction are integrally molded, a position in which the webbing 51 touches each body of the occupants Dr, Fp1, Fp2 can be prevented from being displaced, compared with a case in which the backrest of each seat arranged in the vehicle width direction is moved in the longitudinal direction of the vehicle.

Further, in the above-mentioned embodiments, as to the seat 5, the seat cushions 6 and the seat backs 7 are respectively integrally molded for at least three occupants in the vehicle width direction, the seat cushion 6 is fixed to the lower part of the body 2, the seat back 7 is fixed to an upper part of the body 2, and as to the three point seat belt device 50, the through anchors 53 for the two occupants Dr, Fp2 on both sides in the vehicle width direction out of the plurality of occupants Dr, Fp1, Fp2 are fixed to the vertically extended parts 43a vertically extended outside in the vehicle width direction in the upper part of the body 2, and the through anchor 53 for the occupant Fp1 adjacent to the driver Dr in the center in the vehicle width direction out of the plurality of occupants Dr, Fp1, Fp2 is attached to the headrest 60 for the seat 5c on the opposite side to the seat 5a on the side of the driver Dr or the fixing part 61 that fixes the headrest 60.

As described above, the increase of the weight of the seat back 7 can be avoided by increasing the strength of the upper part of the body 2 by fixing the seat back 7 to the upper part of the body 2. The through anchor 53 is attached to the headrest 60 for the seat 5c on the opposite side to the seat 5a on the side of the driver Dr or its fixing part 61, the webbing 51 for the center seat in the vehicle width direction hardly hinders when one or two persons are seated.

Furthermore, in the above-mentioned embodiments, in the three point seat belt device 50, the mounting part 62 for mounting the through anchor 53 is provided in the inclined extended part 46a that diagonally connects the vertically extended parts 43a vertically extended outside in the vehicle width direction in the upper part of the body 2 and the center in the vehicle width direction in the lower part of the body 2.

As described above, as the mounting part for mounting the through anchor 53 is provided in the inclined extended part 46a that forms truss structure between the upper and lower parts of the body 2, the strength of the mounting part 62 for mounting the through anchor 53 can be readily secured.

In the above-mentioned embodiments, the example in which no headrest that can hold the head of the first occupant Fp1 is provided is described, however, the present invention is not limited to the example. For example, a headrest that can hold the head of the first occupant Fp1 may also be further provided.

Furthermore, in the above-mentioned embodiments, as to the three point seat belt device 50, the example in which the through anchor 53 for at least the first seat 5b out of the plurality of seats 5a, 5b, 5c adjacent to one another in the vehicle width direction is attached to the headrest 60 for the second seat 5c located next to the first seat 5b or the fixing part 61 that fixes the headrest 60 for the second seat 5c is described, however, the present invention is not limited to the example.

For example, the seat 5 may also be further provided with a headrest 60 fixed to the body 2 separately from the seat back 7 and in the three point seat belt device 50, a through anchor 53 may also be attached to the headrest 60 or a fixing part 61 that fixes the headrest 60.

As the through anchor 53 is fixed to the headrest 60 fixed to the body 2 separate from the seat back 7 or its fixing part 61, no load of the shoulder belt part SB is applied to the seat back 7. Therefore, the seat back 7 can be lightened. When the webbing 51 is worn, the shoulder belt part SB can be extended diagonally downward out of the through anchor 53. Thereby, when the shoulder belt part SB is set in the suitable position of each shoulder of the occupants Dr, Fp1, Fp2, the through anchor 53 can be set in the advantageous position in terms of strength and the seat belt installation structure can be lightened.

Moreover, in the above-mentioned embodiments, the example in which the seat cushion 6 and the seat back 7 in the seat 5 are respectively integrally molded for three occupants in the vehicle width direction is described, however, the present invention is not limited to this example. For example, the seat cushion 6 and the seat back 7 in the seat 5 may also be respectively integrally molded for four occupants in the vehicle width direction. That is, as to the seat 5, the seat cushion 6 and the seat back 7 respectively only have to be integrally molded for at least three occupants in the vehicle width direction.

In addition, in the above-mentioned embodiments, the example in which the seat cushion 6 is fixed and supported to/by the seat cushion frame 28 that configures the body frame 20 is described, however, the present invention is not limited to this example. The seat cushion 6 may also be fixed and supported to/by the bracket provided to the body frame 20. That is, the seat cushion 6 only has to be fixed to the lower part of the body 2.

Further, in the above-mentioned embodiments, the example in which the seat back 7 is fixed and supported to/by the cross part 29a, the supporting part 29b and the pair of right and left coupling parts 29c respectively of the seat back frame 29 (see FIG. 4) that configures the body frame 20 is described, however, the present invention is not limited to this example. For example, the seat back 7 may also be fixed and supported to/by the bracket provided in the roll bar 3. That is, the seat back 7 only has to be fixed to the upper part of the body 2.

Furthermore, in the above-mentioned embodiments, the example in which the through anchors 53 for the two occupants Dr, Fp2 on both sides in the vehicle width direction out of the occupants Dr, Fp1, Fp2 are fixed to the centers in the vertical direction of the right and left center side parts 43a of the center upper roll bar 43 is described, however, the present invention is not limited to this example. For example, the through anchors 53 for the two occupants Dr, Fp2 on both sides in the vehicle width direction out of the occupants Dr, Fp1, Fp2 may also be fixed to the vertical pipes provided outside in the direction of vehicle of the roll bar 3. That is, the through anchors 53 for the two occupants Dr, Fp2 on both sides in the vehicle width direction out of the occupants Dr, Fp1, Fp2 only have to be fixed to the vertically extended parts vertically extended outside in the vehicle width direction in the upper part of the body 2.

Furthermore, in the above-mentioned embodiments, the example in which the first retractor 52a and the third retractor 52c are supported by the right and left sides in the vehicle width direction of the body frame 20 (see FIG. 3) and the second retractor 52b is supported by the center in the vehicle width direction of the body frame 20 is described, however, the present invention is not limited to this example. For example, the first retractor 52a and the third retractor 52c may also be supported by the right and left sides in the vehicle width direction of the roll bar 3 (see FIG. 3) and the second retractor 52b may also be supported by the center in the vehicle width direction of the roll bar 3. That is, the retractor 52 only has to be supported by the body 2.

Embodiments of the present invention are not limited to the above-mentioned embodiments. For example, certain embodiments of the present invention may also be applied to various vehicles such as a motorcycle and a three-wheeled vehicle without limiting to the above-mentioned four-wheel vehicle.

The configuration in the above-mentioned embodiments is one example of the present invention and various variations are allowed in a scope in which the variations do not deviate from the object of the present invention such as the components in the embodiments are replaced with well-known components.

REFERENCE SIGNS LIST

1 . . . Vehicle
2 . . . Body
5 . . . Seat
5a . . . Seat for driver
5b . . . Seat for first occupant (First seat)
5c . . . Seat for second occupant (Second seat)
6 . . . Seat cushion
7 . . . Seat back
43a . . . Center side part (Vertically extended part)
46a . . . Cross part (Inclined extended part)
50 . . . Seat belt device
51 . . . Webbing
52 . . . Retractor
53 . . . Through anchor
54 . . . Outer anchor (Supporting part)
56 . . . Buckle (Supporting part)
60 . . . Headrest
61 . . . Fixing part
62 . . . Mounting part
Dr . . . Driver (Occupant)
Fp1 . . . First occupant (Occupant)
Fp2 . . . Second occupant (Occupant)
SB . . . Shoulder belt part
LB . . . Lap belt part

The invention claimed is:

1. A seat belt installation structure of a vehicle, the seat belt installation structure comprising:
   a seat comprising a seat cushion and a seat back, on which an occupant can be seated in a vehicle width direction;
   a three point seat belt device comprising:
      a retractor supported by a body of the vehicle and configured to wind a webbing;
      a through anchor disposed above the seat back, the through anchor configured to guide a shoulder belt part configured to restrain a shoulder of the occupant out of the webbing pulled out of the retractor when the webbing configured to restrain the body of the occupant on the seat is worn; and
      supporting parts disposed on both sides of a position of a loin of the occupant on the seat cushion, the supporting parts configured to support a lap belt part configured to restrain the loin of the occupant out of the webbing pulled out of the retractor when the webbing is worn; and
   a roll bar,
   wherein the roll bar includes
      right and left center side parts extending in a vertical direction of the vehicle,
      a center upper roll bar that extends in the vehicle width direction and disposed between the right and left center side parts, and
      an inclined center cross roll bar that extends in the vehicle width direction of the vehicle;
   a bracket fixed to the inclined center cross roll bar; and
   a headrest fixed to the bracket,
   wherein the bracket includes a mounting part, and
   wherein in the three point seat belt device, a through anchor for at least a first seat out of a plurality of seats adjacent to one another in the vehicle width direction is attached directly to the mounting part of the bracket.

2. A seat belt installation structure of a vehicle, the seat belt installation structure comprising:
   a seat comprising a seat cushion and a seat back, on which an occupant can be seated in a vehicle width direction;
   a three point seat belt device comprising:
      a retractor supported by a body of the vehicle and configured to wind a webbing;
      a through anchor disposed above the seat back, the through anchor configured to guide a shoulder belt part configured to restrain a shoulder of the occupant out of the webbing pulled out of the retractor when the webbing configured to restrain the body of the occupant on the seat is worn; and
      supporting parts disposed on both sides of a position of a loin of the occupant on the seat cushion, the supporting parts configured to support a lap belt part configured to restrain the loin of the occupant out of the webbing pulled out of the retractor when the webbing is worn;
   a roll bar,
   wherein the roll bar includes
      right and left center side parts extending in a vertical direction of the vehicle, a center upper roll bar that extends in the vehicle width direction and disposed between the right and left center side parts, and an inclined center cross roll bar that extends in the vehicle width direction of the vehicle;

a bracket fixed to the inclined center cross roll bar; and a headrest fixed to the bracket, wherein the bracket includes a mounting part, wherein the headrest is fixed separately from the seat back, and in the three point seat belt device, the through anchor is attached directly to the mounting part of the bracket.

3. The seat belt installation structure of the vehicle according to claim 1, wherein:

in the seat, the headrest is fixed to the body of the vehicle separately from the seat back.

4. The seat belt installation structure of the vehicle according to claim 1, wherein:

the plurality of seats adjacent to one another in the vehicle width direction comprises backrests that are integrally molded to be the seat back.

5. The seat belt installation structure of the vehicle according to claim 1, wherein:

the seat cushion and the seat back are respectively integrally molded into the seat for at least three occupants in the vehicle width direction;

the seat cushion is fixed to a lower part of the body of the vehicle;

the seat back is fixed to an upper part of the body of the vehicle; and in the three point seat belt device, through anchors for two occupants on both sides in the vehicle width direction are attached to vertically extended parts vertically extending outside in the vehicle height direction in the upper part of the body of the vehicle.

6. A seat belt installation structure of a vehicle, the seat belt installation structure comprising:

a seat means, comprising a seat cushion and a seat back, for seating an occupant in a vehicle width direction;

a three point seat belt means comprising:

a retractor means supported by a body of the vehicle for winding a webbing;

a through anchor means, disposed above the seat back, for guiding a shoulder belt part configured to restrain a shoulder of the occupant out of the webbing pulled out of the retractor means when the webbing configured to restrain the body of the occupant on the seat is worn; and supporting means, disposed on both sides of a position of a loin of the occupant on the seat cushion, for supporting a lap belt part configured to restrain the loin of the occupant out of the webbing pulled out of the retractor means when the webbing is worn;

roll bar means, wherein the roll bar means includes right and left center side parts means extending in a vertical direction of the vehicle, center upper roll bar means that extends in the vehicle width direction and disposed between the right and left center side parts means, and inclined center cross roll bar means that extends in the vehicle width direction of the vehicle;

bracket means fixed to the inclined center cross roll bar means; and headrest means fixed to the bracket means, wherein the bracket means includes a mounting part, and wherein in the three point seat belt means, through anchor means for at least a first seat out of a plurality of seats adjacent to one another in the vehicle width direction is attached directly to the mounting part of the bracket means.

7. A seat belt installation structure of a vehicle, the seat belt installation structure comprising:

a seat means, comprising a seat cushion and a seat back, for seating an occupant in a vehicle width direction;

a three point seat belt means comprising:

a retractor means, supported by a body of the vehicle, for and winding a webbing;

a through anchor means, disposed above the seat back, for guiding a shoulder belt part configured to restrain a shoulder of the occupant out of the webbing pulled out of the retractor means when the webbing that can restrain the body of the occupant on the seat is worn; and supporting means, disposed on both sides of a position of a loin of the occupant on the seat cushion, for supporting a lap belt part configured to restrain the loin of the occupant out of the webbing pulled out of the retractor means when the webbing is worn;

roll bar means, wherein the roll bar means includes right and left center side parts means extending in a vertical direction of the vehicle, center upper roll bar means that extends in the vehicle width direction and disposed between the right and left center side parts means, and inclined center cross roll bar means that extends in the vehicle width direction of the vehicle;

bracket means fixed to the inclined center cross roll bar means; and headrest means fixed to the bracket means, wherein the bracket means includes a mounting part, wherein the headrest means is fixed separately from the seat back, and in the three point seat belt means, the through anchor means is directly attached to the mounting part of the bracket means.

8. The seat belt installation structure of the vehicle according to claim 6, wherein:

in the seat means, the headrest is fixed to the body of the vehicle separately from the seat back.

9. The seat belt installation structure of the vehicle according to claim 6, wherein:

the plurality of seats adjacent to one another in the vehicle width direction comprises backrests that are integrally molded to be the seat back.

10. The seat belt installation structure of the vehicle according to claim 6, wherein:

the seat cushion and the seat back are respectively integrally molded into the seat means for at least three occupants in the vehicle width direction;

the seat cushion is fixed to a lower part of the body of the vehicle;

the seat back is fixed to an upper part of the body of the vehicle; and in the three point seat belt means, through anchor means for two occupants on both sides in the vehicle width direction are attached to vertically extended parts vertically extending outside in the vehicle height direction in the upper part of the body of the vehicle.

* * * * *